(12) United States Patent  
Roberge

(10) Patent No.: US 6,918,294 B1
(45) Date of Patent: Jul. 19, 2005

(54) VANE FOR MEASURING WIND ORIENTATION WITH INTEGRATED HEATER

(75) Inventor: Philippe Roberge, Issy les Moulineaux (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/856,505

(22) PCT Filed: Dec. 21, 1999

(86) PCT No.: PCT/FR99/03235

§ 371 (c)(1),
(2), (4) Date: Jun. 15, 2001

(87) PCT Pub. No.: WO00/39592

PCT Pub. Date: Jul. 6, 2000

(30) Foreign Application Priority Data

Dec. 23, 1998 (FR) ............................................. 98 16352

(51) Int. Cl.[7] .......................... A63B 53/00; G01P 13/00
(52) U.S. Cl. ............................... 73/170.02; 73/170.05; 73/170.07; 73/170.08
(58) Field of Search ....................... 73/170.02, 170.05, 73/170.06, 170.07, 170.08, 170, 170.12; 261/109; 219/400

(56) References Cited

U.S. PATENT DOCUMENTS

| 3,882,721 | A |   | 5/1975 | Neary et al. | |
| 4,121,088 | A | * | 10/1978 | Doremus et al. | 219/201 |
| 4,499,034 | A | * | 2/1985 | McAllister, Jr. | 261/109 |
| 5,438,865 | A |   | 8/1995 | Greene | |
| 5,478,985 | A | * | 12/1995 | Hoetzl et al. | 219/400 |
| 5,750,891 | A | * | 5/1998 | Brocklehurst | 73/178 |
| 5,917,699 | A | * | 6/1999 | Hung et al. | 361/697 |
| 5,971,846 | A | * | 10/1999 | Cho et al. | 484/283 |

FOREIGN PATENT DOCUMENTS

EP        0 100 715       2/1984

* cited by examiner

Primary Examiner—Andrew H. Hirshfeld
Assistant Examiner—Marissa Ferguson
(74) Attorney, Agent, or Firm—Oblon, Spivak, McClelland, Maier & Neustadt, P.C.

(57) ABSTRACT

Weather vanes (1) are delicate instruments partially exposed to external conditions. They are used in particular in the aeronautical industry. The measurements provided by these weather vanes are crucial to the flying of an aircraft. A type of weather vane is proposed in which a vane can be changed. Changing the vane entails adjusting the orientation sensors (3). To perform this adjustment, use is made of a factory setting rig (16) that allows the various parts of the weather vane to be placed in a characteristic position.

10 Claims, 3 Drawing Sheets

VANE FOR MEASURING WIND ORIENTATION WITH INTEGRATED HEATER

Figure 1:
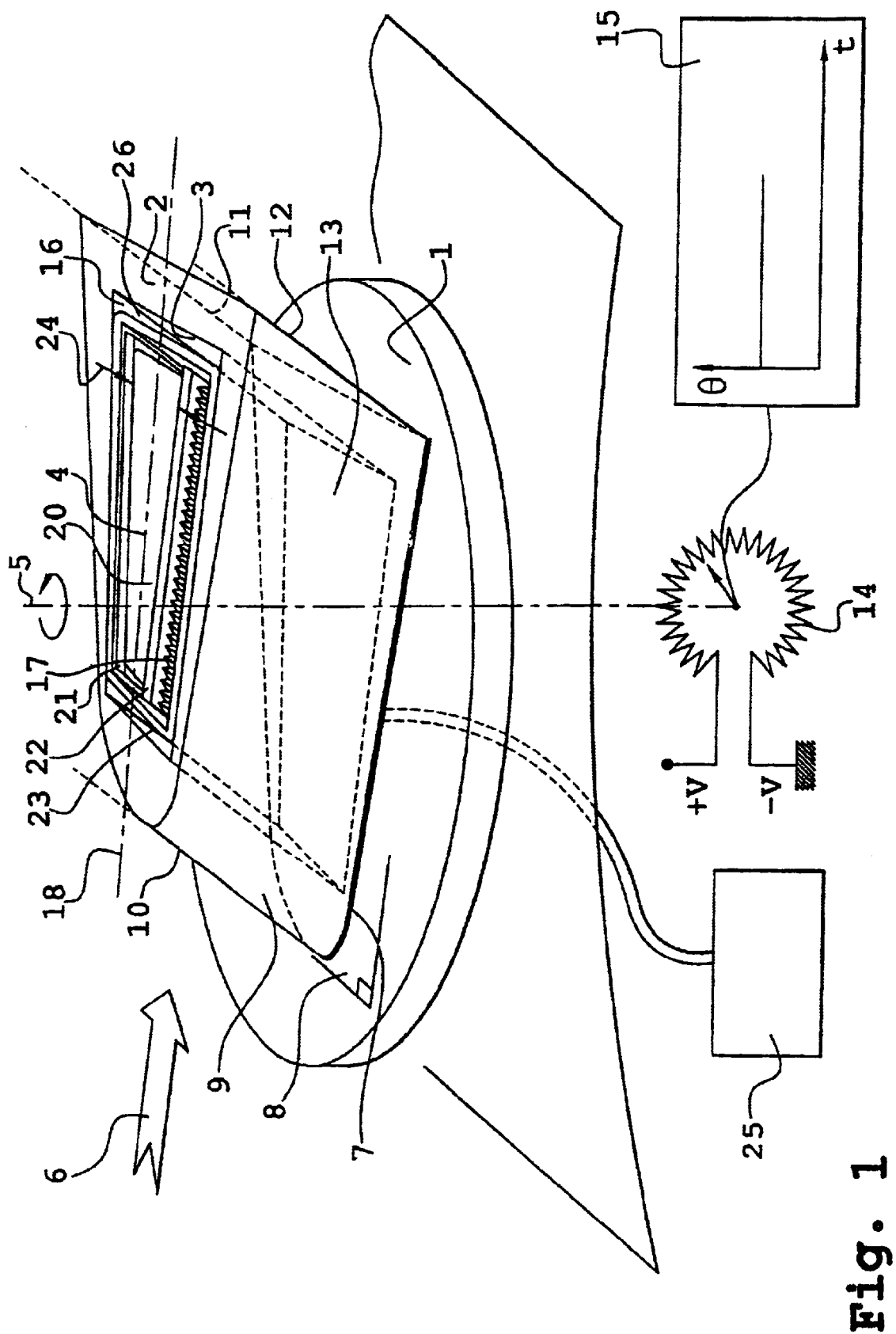

The subject of the present invention is a weather vane for measuring the orientation of the wind. In the invention, the weather vane comprises a vane with a built-in heater. It finds a more particular application in the aeronautical industry, where a weather vane such as this provides information about the orientation of the apparent wind of an aircraft. The weather vane of the invention can nonetheless be used in other fields, particularly in meteorology, especially when the temperature and humidity conditions are severe. An object of the invention is to make the construction of such a weather vane more reliable.

In order for an aircraft to be flown, knowledge of the orientation of the apparent wind in which the aircraft is flying is needed. This knowledge makes it possible to calculate an angle-of-attack parameter, from which a critical parameter, namely lift, is calculated. Knowledge of the lift of the aircraft at every moment during the flight is absolutely essential to flight safety. This knowledge is provided in part by a weather vane. The weather vane is an element fixed on the external structure of the aircraft. Like any external element attached to an aircraft this weather vane has to be deiced, and has to be impervious. An object of the invention is to guarantee integral heating and imperviousness of a vane of the weather vane, which is a moving external part of the aircraft.

The vane of the weather vane has to be deiced so that the orientation of the wind as given by this weather vane is not biased by external deformation, of ice, which imbalances the weather vane, thus biasing the measurement of the orientation of the apparent wind and the lift calculations associated with this orientation.

On the other hand, the vane of the weather vane has to be impervious. This imperviousness makes it possible to avoid the ingress of moisture into electrical heating systems. What happens is that such infiltrations may cause short-circuits which lead either to a loss of vane deicing, or to a break in an electrical supply to the heating system and therefore to an error in the measurement provided.

In order to guarantee the deicing of the vane of the weather vane, an elongate heating element known as a heater is placed inside the vane. This heater heats the exterior surfaces of the vane from inside the vane. This heater is an electrical system. In the state of the art, the heater is inserted into the vane via a slot situated at a trailing edge of the vane. The existence of this slot in contact with the air surrounding the aircraft leads to a problem of sealing.

To guarantee the imperviousness of the vane of the weather vane after the heater has been inserted, a resin is poured into this slot. The resin has to fill the entirety of the slot that allows the heater to be inserted. This resin is in contact with the body of the vane, with the heater, and with the external air.

The resin has therefore to have the following technical properties: good electrical insulation with respect to the heater, good thermal conductivity in order to guarantee deicing of the region of the slot in the vane, good adhesion to the material of which the vane is made, so as to ensure complete plugging of the slot, good flexibility in order without cracking to withstand the differential expansions of the heater and of the vane, and finally a good ability to maintain these properties at the extreme temperatures of −60° C. to +220° C.

Finding a resin which has all these properties poses problems because the properties required are contradictory and cannot coexist with the same level of performance within a single resin. The invention has set out to solve the problem of these contradictory requirements. To this end, the sealing functions have been separated from the electrical insulation and thermal conductivity functions. In the invention, the resin will no longer need to fulfil the sealing function or, if this function remains, one and the same resin will no longer have to fulfil two types of function. The issue of sealing the slot through which the heater is inserted is in fact settled by quite simply omitting this slot.

The heater is therefore inserted into the vane via another location thereof; particularly via its base. The vane, instead of having the overall shape of a dihedron, open on its trailing edge, therefore has the shape of a tube, of tapered cross section so as to have leading and trailing edges. The heater is inserted into this tube via one of the ends of this tube. In this case, the vane is hollow, whereas the dihedron-shaped vanes of the state of the art are not hollow. It can be demonstrated that by operating in this way, it is possible, on the one hand, to separate the functions of the resin and, on the other hand, to better arrive at the required performance.

A subject of the invention is therefore a weather vane for measuring the orientation of the wind, comprising a rotary base, a vane sensitive to the wind and fixed by a joint to the base, and a heater inserted into the vane, characterized in that the vane of the weather vane is hollow and has an insertion orifice situated at the base of the vane so that the heater can be inserted.

Figure 2A:
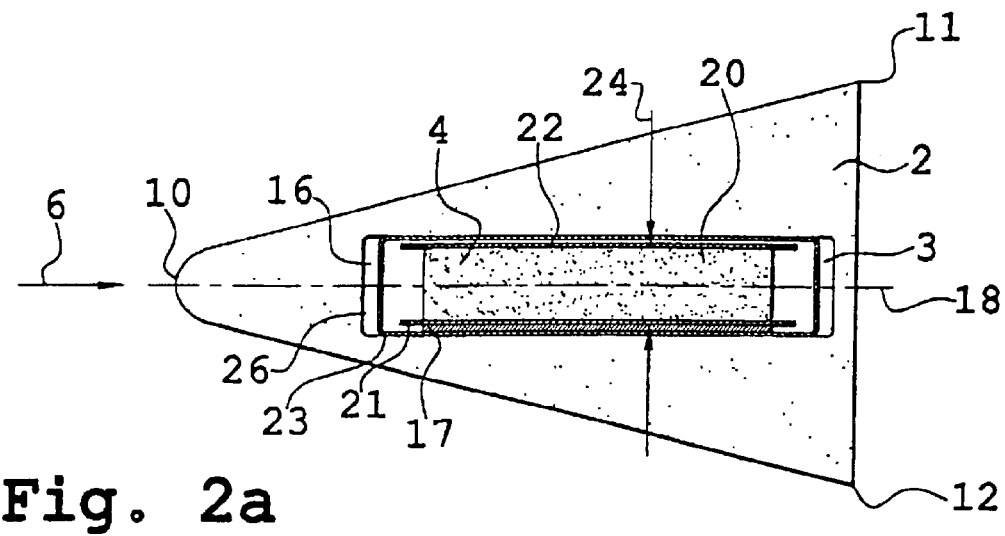
Figure 2B:
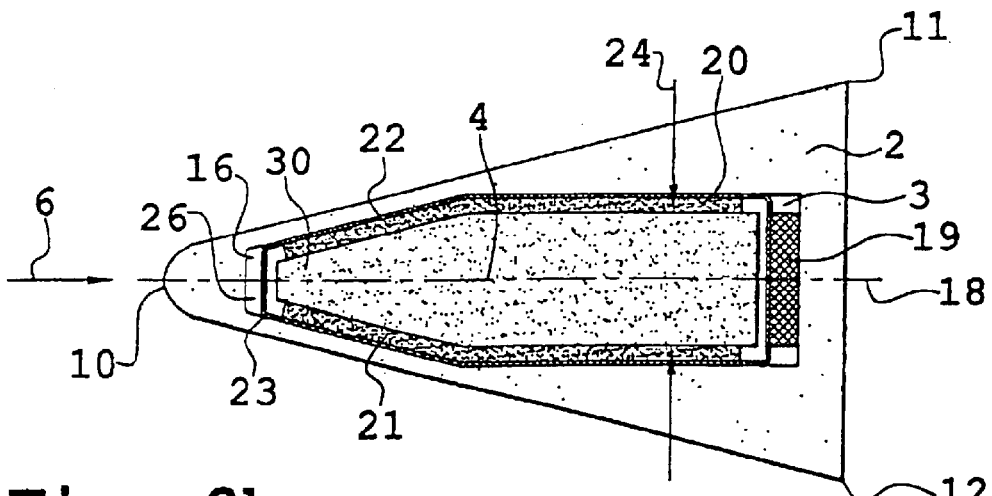
Figure 2C:
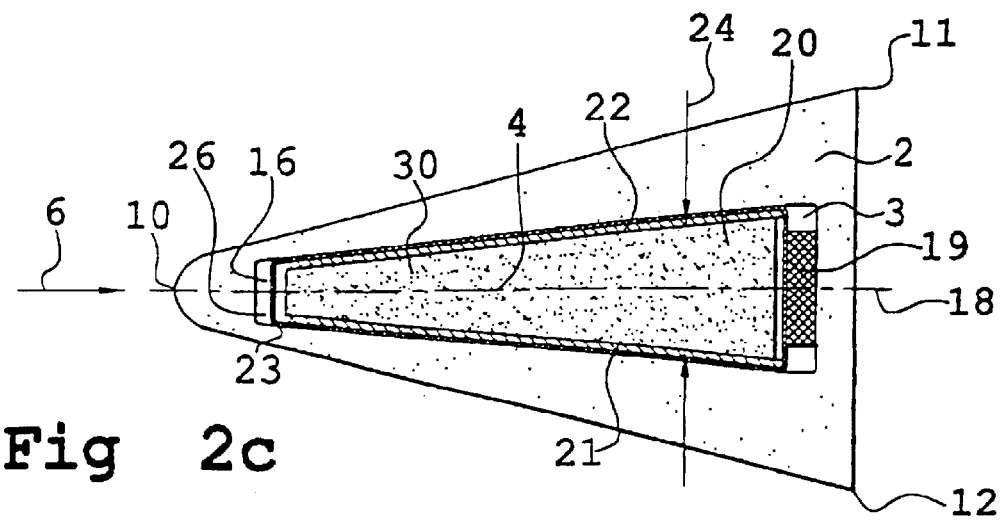
Figure 3:
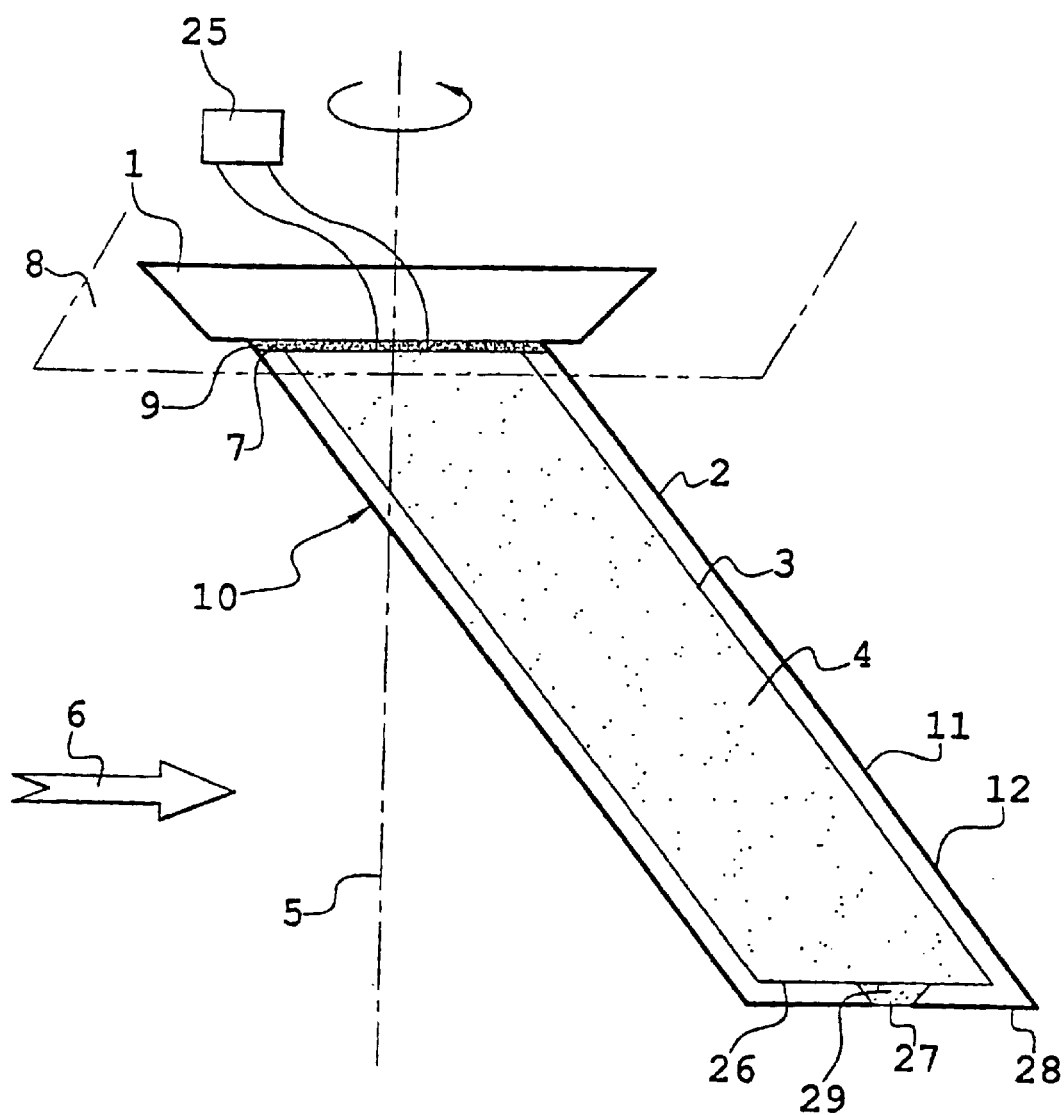

The invention will be better understood from reading the description which follows and from examining the accompanying figures. These are given only by way of entirely nonlimiting indication of the invention. The figures show:

FIG. 1: a truncated schematic depiction of the nose of an aircraft carrying a weather vane according to the invention, viewed in section. The weather vane may just as easily be situated above as below the aircraft;

FIG. 2a: a schematic section of the body of the vane perpendicular to a leading edge of the vane;

FIG. 2b: a section of the same type as that of FIG. 2a, and showing a second type of heater allowing optimized deicing of the exterior surfaces of the vane of the weather vane;

FIG. 2c: a section of the same type as that of FIG. 2b, and showing another type of heater allowing optimized deicing of the exterior surfaces of the vane of the weather vane;

FIG. 3: a schematic section of the vane and of the rotary base along a plane of symmetry of the vane.

FIG. 1 shows a weather vane according to the invention. The latter comprises a base 1 on which a vane 2 is fixed. The vane 2 is hollow in its interior 3 which contains a heater 4. The base 1 can rotate with the vane 2 about an axis of rotation 5. The base 1 is driven by the vane 2. The vane 2 actually orientates itself freely according to the direction of the wind 6.

The vane 2 is fixed to the base 1 by a joint 7. The vane 2 is a body, the shape of which is derived from that of a truncated closed cylinder. The shape of this cylinder is defined as follows. It comprises, standing up on a plane 8 of the base 1, an exterior surface 9. The exterior surface 9 is continued heightwise along a leading edge 10 and two trailing edges 11 and 12. In one example, the surface 9 has a profile in the shape of an isosceles triangle. The vertices of this isosceles triangle are defined by the intersections between the leading 10 and trailing 11 and 12 edges of the surface 9 and the plane 8. The tip of the isosceles triangle points toward the leading edge 10. The surface 9 rests in contact with the base 1 via the joint 7. The surface 9 forms a hollow tube. This hollow tube at one of its ends has an orifice 13. The orifice 13 opens into the cavity 3 of the vane 2 and this orifice 13 allows the heater 4 to be inserted into the cavity 3.

An essential feature of the invention is that the cavity 3 is obtained from the tubular and hollow surface 9, rather than from a dihedral surface defined between the two trailing edges 11 and 12. The vane 2 is therefore a hollow element, not open at the rear of its lateral faces. One advantage of this feature of the invention lies in the fact that the profile of the surface 9 is a closed truncated profile and that it may have a non-truncated, for example elliptical shape, thus minimizing drag due to the trailing edges 11 and 12.

The vane 2 and the base 1 are connected to one or more orientation sensors. For example, an orientation sensor may be represented schematically by a potentiometer 14. As a preference, the orientation sensor comprises a resolver or synchrodetector. The axis of rotation 5 of the vane 2 is secured to a slider or some other type of excitation device, pointing to a zone of the potentiometer 14 corresponding to the orientation of the wind 6. The potentiometer 14 shown is powered between −V and +V. An analogue-digital converter (not depicted) can convert the value of the voltage supplied by the slider of the potentiometer 14 into a binary signal, the value of which indicates the orientation of the wind. This signal may be displayed on a display 15.

In one example, the vane 2 is made of aluminum alloy, or of some other light metal alloy, resistant to impact and a good conductor of heat. It may be formed by extrusion, molding and machining. The vane 2 may be hollowed by electron discharge machining using a wire, or may be broached in the case of mass production.

The hollow in the surface 9 thus defines the cavity 3 in which the heater 4 is housed. The heater 4 has an elongate shape. The orifice 13 and the cavity 3 are wider than the heater 4. After the heater 4 has been inserted in the cavity 3, a space 16 remains between the walls of the cavity 3 and the exterior surfaces of the heater 4. The contours of the heater 4 follow the shape of the cavity 3, so as to minimize the volume of the space 16.

The heater 4 comprises a heating resistive element surrounded by two electrodes coated in an electrically insulating film. The heater 4 is therefore not in perfect contact with the walls of the cavity 3, which it has to heat. In order to increase the surface area of the zones of contact between the heater 4 and the walls of the cavity 3, a spring 17 is placed between the heater 4 and one of the interior walls of the hollow vane 2. On the opposite side to this spring, the heater 4 is pressed firmly against the interior wall of the vane 2. On the side of the spring 17, thermal contact is ensured by a grease.

According to FIGS. 1 and 2a, the spring 17 is preferably formed of a beryllium bronze plate. The spring 17 is pressed along one of the faces of the heater. The spring 17 has the shape of a plate running along the heater 4, along the axis of insertion of the heater into the cavity 3. The spring 17 is preferably included within the heater 4. The spring 17 is therefore pressed between one of the electrodes and an electrically insulating film. The spring 17 pushes the heater 4 against the opposite wall of the cavity 3. The spring 17 encourages contact between walls of the cavity 3 and the heater 4. It transmits heat from the heater 4 to the vane 2 via the crinkles formed in the plate of which it is made. The space 16 is thus eliminated, and the areas of contact between walls of the cavity 3 and heater 4 are increased.

According to FIGS. 1 and 2a, the orifice 13 has a rectangular shape elongate along an axis 18 perpendicular to the leading edge 10. The axis 18 passes through the centerline of the isosceles 35 triangle defined by the profile of the surface 9. The heater 4 has the same type of shape as the orifice 13, defined according to FIGS. 1 and 2a.

According to FIG. 2b, the orifice 13 is in the form of an ogive. It is characterized in that the tip of the ogive faces toward the tip of the isosceles triangle defined by the surface 9. The heater 4 thus has, in a profile perpendicular to the direction of insertion, an ogive shape 30. The section through the heater according to FIG. 2b is also in the shape of an ogive, facing along the same axis as the ogive of the orifice 13. The leading edge 10 of the vane 2 is generally the coldest, because it is directly subjected to the wind. This portion of the vane 2 most especially needs good deicing. This is why the heater 4 has to be particularly in contact with the walls of the cavity 3 in this region. As the cavity 3 is wider than the heater, a spring 19 is inserted into the space 16 to push the heater toward the leading edge, toward the walls of the cavity 3 which need to be deiced the most. The spring 19 may be constructed like the spring 17.

According to FIG. 2c, the orifice 13 has a more pronounced ogive shape than FIG. 2b. The orifice 13 has the shape of a trapezium oriented in the same way as the ogive of FIG. 2b. The heater 4 therefore also has the shape of a trapezium, oriented in the same way as in FIG. 2b.

A first improvement proposed in FIGS. 2b and 2c is to place a spring 19 at the opposite end to the tip of the ogive or of the trapezium. The spring 19 is placed between a large base of the ogive (or trapezium) of the orifice 13, and a large base of the ogive (or trapezium) of the heater 4. The spring 19 is preferably external to the heater 4. The springs 17 and 19 nonetheless constitute thermal obstacles. In FIGS. 2b and 2c the spring 19 is placed near the trailing edges 11 and 12. The asymmetry imposed by the spring 17 is thus eliminated. In addition, the part of the vane at the same end as the trailing edges 11 and 12 has the least need for heating. Thus, the detrimental consequences of the position of the spring are minimized.

A second improvement proposed according to FIGS. 2b and 2c stems from the fact that the shape of the orifice 13 varies. The thickness of the tube of which the vane is formed varies. The shape of the heater 4 can be tailored to the cavity 3 of the vane 2. The thickness of the tube of the vane 2 is designed to be minimized for regions of the vane requiring the most deicing.

The heater 4 housed inside the cavity 3 has a shape derived from a parallelepiped. This shape is cylindrical with one generator oriented along the axes defined by the leading 10 and trailing 11 and 12 edges. According to FIGS. 1 and 3, the leading edge 10 and the trailing edges 11 and 12 are mutually parallel. They are preferably inclined with respect to the axis of rotation 5 of the base 1 so that the leading edge 10 intersects the axis of rotation 5. In this case, the heater 4 may, in a plane containing the axis 5 of rotation and the axis 18, have a profile in the shape of a parallelogram inserted into the vane 2 along one of its sides. This is nonlimiting; it is possible for the leading 10 and trailing 11 and 12 edges not to be parallel, just as it is possible for them not to be inclined with respect to the axis of rotation 5.

The heater 4 has ceramic blocks 20 forming a resistive heating element. The blocks are surrounded by two conducting plates 21 and 22. The collection of components 20, 21 and 22 is coated in a film 23 which is an electrical insulator but a good conductor of heat. The plates 21 and 22 are held facing each other on the collection of ceramic blocks 20. The plates 21 and 22 act as electrodes.

The ceramic blocks 20 have variable geometry. The variable thickness of the heater, dictated by the internal geometry of the cavity 3, is obtained by a variable thickness of the ceramic blocks, and by curvature of the, plates 21 and 22. In the plane of section in FIGS. 1, 2a, 2b and 2c, the thickness 24 of the ceramic blocks varies from about one millimeter to a few millimeters. The thicknesses of the electrodes 21 and 22 and of the film 23 in FIGS. 1, 2a, 2b and 2c are preferably less than the thickness 24.

The ceramic blocks 20 preferably form resistive elements with a positive temperature coefficient. The two electrodes 21 and 22 are connected to an electrical power supply 25. These two plates 21 and 22 preferably are made of brass (FIG. 3). This material is chosen for its low resistivity and because brass does not migrate very much under the effect of temperature through the ceramic blocks 20 when heat is created.

The plates 21 and 22 are applied to the ceramic blocks 20 via a spring 17 or a spring 19. In the state of the art, the plates 21 and 22 are brazed to the block 20. The advantage that the invention affords is that the plates 21 and 22 can be kept in contact with the block 20 without being brazed. The disadvantages of brazing are thus eliminated. Specifically, a first disadvantage with brazing lies in the fact that the ceramic blocks which have a positive temperature coefficient degrade at the time of brazing. On the other hand, a second disadvantage lies in the fact that the electrodes 21 and 22 are secured to the ceramic blocks 20 while they are made of materials which have very different expansion coefficients. This difference generally leads to breakage of the heater 4.

The power delivered by the heater 4 is inversely proportional to the resistance of the ceramic blocks 20. The function defining the power is of the type: $P=U^2/R$. The ceramic blocks with a positive temperature coefficient are characterized by the fact that their resistance is an increasing function of temperature. The desired deicing of the vane has to be tailored to the temperature gradient applied to the vane 2 in the flight phase. According to the invention, a first improvement to the heating of the vane is the automatic slaving of the heating to the temperature gradient of the vane. What happens is that the colder the vane is at any point, the more the heater will supply heat to that point.

According to FIGS. 2b and 2c, a second improvement of the heating is possible. Specifically, at the front of the vane, because of the reduction in the thickness 24 of the ceramic blocks, their resistance decreases, and therefore the maximum power delivered in this region is greater.

The film 23 coating the two electrodes 21 and 22, themselves surrounding the ceramic blocks 20, is an electrical insulator, which is also a good conductor of heat. The film 23 electrically insulates the mounting of the two electrodes 21 and 22 and of their electrical power supply connections 25. In one example, the film 23 is made of polyimide.

The heater 4 is coated with grease 26. The grease 26 makes it easier to insert into the cavity 3 of the vane 2. The grease 26 comes into contact with the electrically insulating film 23. This grease 26 occupies all the empty space between the heater 4 and the walls of the cavity 3. The grease 26 is preferably a grease without air bubbles because it has to act as a good conductor of heat. Specifically, the heat developed by the complex of the ceramic blocks 20 surrounded by the two electrodes 21 and 22 and the film 23 has also to be conducted without losses to the regions where deicing is wanted: toward the body of the vane 2. The grease 26 has also to be a good electrical insulator, as has the film 23. This grease 26 is preferably a grease of the type used for mounting heat sinks on power transistors.

In order to guarantee the absence of air in the cavity 3 after the grease 26 and then the heater 4 have been inserted in the cavity 3, a vent 27, situated at another end 28 of the vane 2, opposite the orifice 13, allows the excess grease 26 to be removed. As a preference, the amount of grease 26 inserted in the cavity 3 is optimized to avoid overspill. In this case, there is no vent on the vane 2.

The optional vent 27 is of a size very much smaller than that of the orifice 13 placed on the surface 8. Once the heater 4 has been mounted in the body of the vane 2, this vent 27 is plugged with a resin 29 whose only functions are to adhere firmly to the material of which the vane 2 is made in order to completely plug the vent, to have good flexibility in order without cracking to absorb the dimensional variations of the heater 4 and of the vane 2 which are associated with the variations in temperature, and finally to maintain these properties well at the extreme temperatures of −60° C. to +220° C. This resin 29 is preferably a simple silicone resin. This type of resin guarantees that the plugging will be impervious. This resin 29 does not need to be a good conductor of heat because it is not in contact with the external air except for the size of the vent 27, which is itself very small. This resin 29 is not in direct contact with the heater, and does not necessarily therefore have to have the properties of a good electrical insulator. This type of resin guarantees that the vent 27 is plugged imperviously.

The vane 2 and the base 1 preferably form a onepiece assembly. In this case, the heater 4 is inserted in the cavity 3 of the vane 2 via an orifice made in the base 1. The orifice in the base 1 has an opening greater than or equal to that defined by the orifice 13. The heater insertion orifice is plugged after the heater has been inserted. This orifice, which is on the surface of the base 1 that is not exposed to the external conditions, is plugged with a resin. The resin used is of the same type as the resin 29 and is preferably a simple silicone resin:

What is claimed is:

1. A weather vane for measuring orientation of wind, comprising a rotary base, a vane sensitive to the wind and fixed by a joint to the base, and a heater inserted into the vane, wherein the vane is hollow and has an insertion orifice situated at the base of the vane so that the heater can be inserted.

2. The weather vane as claimed in claim 1, wherein the heater is pressed against interior walls of the hollow vane by a spring preferably placed on just one of the lateral faces, or at the rear, of this heater, and the spring preferably is a crinkle spring made of bronze.

3. The weather vane as claimed in claim 1, wherein the heater comprises ceramic blocks of varying thickness held against two electrodes themselves wrapped in an electrically insulating film, the electrodes preferably being made of brass.

4. The weather vane as claimed in claim 3, wherein the electrically insulating film is coated with a thermally conducting grease.

5. The weather vane as claimed in claim 1, wherein the vane has a vent situated opposite the insertion orifice.

6. The weather vane as claimed in claim 1, wherein the heater comprises ceramic blocks with a positive temperature coefficient.

7. The weather vane as claimed in claim 1, wherein the heater has a thickness that varies according to an internal geometry of the hollow of the vane.

8. The weather vane as claimed in claim 1, wherein the heater has, in a profile perpendicular to a direction of insertion, an ogive shape.

9. The weather vane as claimed in claim 1, wherein the vane is in a shape of a tube, inside which the heater is inserted, and in that a thickness of the tube is minimized for regions of the vane which need to be deiced the most.

10. The weather vane as claimed in claim 9, wherein a thickness of the tube is minimized in a region of a leading edge of the vane.

* * * * *